July 31, 1962 A. MILLER 3,047,505

MAGNETIC RECORDING MEDIA

Filed May 7, 1959

INVENTOR.
ARTHUR MILLER
BY
W.S. Hill
AGENT

United States Patent Office 3,047,505

Patented July 31, 1962

3,047,505

MAGNETIC RECORDING MEDIA

Arthur Miller, Princeton, N.J., assignor to Radio Corporation of America, a corporation of Delaware Filed May 7, 1959, Ser. No. 811,719

12 Claims. (Cl. 252—62.5)

This invention relates to improved magnetic recording tape and similar magnetic recording media. This invention relates also to improved ferrites having elongated shape for said magnetic tape and to improved methods for preparing said ferrite particles.

A ferrite is a material having a spinel-type crystal structure and the general molar composition $A_a^{+\alpha}B_b^{+\beta} \ldots N_n^{+\nu}O_4$, where A, B, . . . N are cations, which may be one or more in number; $a, b, \ldots n$ are respectively the number of atoms of cations A, B, . . . N per formula unit; and $\alpha, \beta \ldots \nu$ are respectively the valences of cations A, B, . . . N; where one of the cations present in appreciable amounts is trivalent iron; where the sum of $a+b \ldots$ n has a value between 2⅔ and 3, and where the sum of $a\alpha+b\beta \ldots n\nu$ is about eight.

Magnetic recording tape has heretofore been made comprising a non-magnetic backing such as paper or plastic, impregnated or coated with magnetic ferrite particles in a binder. Magnetic recording tapes fabricated with particles of previously known ferrites have not been entirely satisfactory because the remanent magnetization thereof is low and because the coercive force thereof is high. This is generally attributed to the fact that the inherent high remanent magnetization of the ferrites cannot be realized due to the relatively random orientation and generally spherical shape of the ferrite particles in the medium.

Subsequently, certain special magnetic iron oxide particles having a spinel-type crystal structure were proposed which have an elongated shape (shape anisotropy) and whose major axis substantially coincides with the axis of magnetic anisotropy. Other ferrities having an elongated particle shape were unknown. By virtue of the shape anisotropy, it became feasible to orient the particles in the recording medium, thereby realizing in the medium a greater part of the inherent magnetic properties of the iron oxide particles. Such iron oxide particles are prepared by providing elongated particles of non-magnetic hydrated iron oxide, particularly $Fe_2O_3.H_2O$ and then, by special processing, removing all of the water of hydration and, optionally, a part of the oxygen without destroying the elongated characteristic of the particles. The resultant products are composed of either ferrosoferric oxide, $Fe_3O_4$, or gamma ferric oxide, $Fe_2O_3$, and contain only iron and oxygen. They are described as acicular iron oxides.

Magnetic recording tapes prepared with such elongated magnetic iron oxide particles, while satisfactory for some purposes, are limited in the coercive force and remanent magnetization which can be attained. This is due to the fact that the materials contain only iron and oxygen. Thus, the design of recording and playback equipment is limited to the attainable characteristics. Furthermore, the elongated magnetic iron oxides are relatively expensive, thus economically limiting the applications for such tapes.

An object of this invention is to provide improved magnetic recording media.

A further object is to provide improved magnetic material particularly useful in magnetic recording media and to improved methods of preparation of said materials.

In general, the magnetic recording media herein comprise a support and a magnetic layer thereon including a particulate magnetic material in a solid binder, said magnetic material consisting essentially of elongated ferrite particles having a length-to-width ratio of at least 2 to 1 and containing cations other than ferrous and ferric cations. The ferrites herein all have a spinel-type crystal structure and the molar composition $$A_a^{+\alpha}B_b^{+\beta} \ldots N_n^{+\nu}O_4$$

where A, B, . . . N represent cations, which are at least two in number, $a, b, \ldots n$ represent respectively the number of atoms of cations A, B, . . . N per formula unit, and $\alpha, \beta \ldots \nu$ represent respectively the valences of cations A, B, . . . N, where one of the cations present in appreciable amounts is trivalent iron, where $a+b+ \ldots n$ has a value that is essentially between 2⅔ and 3, where $a\alpha+b\beta \ldots +n\nu$ is equal to about eight, and where the cations A, B, . . . N include at least one of the class of rapidly diffusible cations, preferably $Li^+$, $Zn^{+2}$, $Mn^{+2}$, $Cu^{+2}$, $Ga^{+3}$, $Ge^{+4}$. By virtue of including one of the foregoing class of rapidly diffusible cations, the elongated ferrite particles herein are advantageous for magnetic recording media for the following reasons: First, the elongated ferrite particles herein have inherently better magnetic properties for recording media than the elongated magnetic iron oxides. Second, the magnetic properties of the elongated ferrite particles herein may be modified simply by compositional variation. And, third, the inherent magnetic properties may be realized in the recording media because the elongated particles (shape anisotropy) and the small size of the particles permits practical orientation thereof.

The improved magnetic materials herein may be prepared by novel and improved processes comprising diffusing cations and charge compensating anions into acicular or other elongated shape particles of iron oxide without materially altering the elongated shape characteristics of said iron oxide particles, and retaining said cations in said particles subsequent to said diffusion.

Unlike previous processes, the processes herein diffuse into the particle constituents which are essential to both producing ferrites and to improving the magnetic properties of the particles. The rate of diffusion of said constituents is competitive with the rate at which the length-to-width ratio of the particles is reduced. This ratio reduction may be looked upon as the migration of iron ions in the crystal. Thus, it has been found that only those cations or combinations of cations with high diffusion rates relative to iron may be used. Preferred cations are $Li^{+1}$, $Zn^{+2}$, $Mn^{+2}$, $Cu^{+2}$, $Ga^{+3}$ and $Ge^{+4}$. Preferred anions are $O^{-2}$.

The invention is described in more detail in the following description read in conjunction with the drawings in which.

Figure 1:
FIGURE 1 is a magnetic recording tape according to the invention.

A particular procedure for producing elongated particles of zinc ferrous ferrite herein is to provide elongated iron oxide particles and then to diffuse zinc oxide into the particles, to react the diffused zinc oxide with the iron oxide and to develop the spinel-type cubic crystal structure. All of this is accomplished without destruction of the elongation of the particles.

Acicular iron oxides comprising elongated particles are known in the chemical art and may be obtained commercially. Some are hydrous and some are substantially free of combined water; some are magnetic and some are non-magnetic; some contain the iron entirely in the trivalent state and in others, a portion of the iron oxide is in other valence states. Two suitable acicular iron oxides are referred to in the art as alpha iron oxide, $\alpha$-$Fe_2O_3$, and hydrated alpha iron oxide, $\alpha$-$Fe_2O_3.H_2O$. Elongated particles of both materials are non-magnetic and may be provided with an average length-to-width ratio of about 6 to 1. A suitable acicular $Fe_2O_3.H_2O$ may be prepared as follows. React 3 grams NaOH in 10 grams water with 12 grams $FeSO_4.7H_2O$ in 60 grams water with agitation and exposure to air for about 17 hours. This produces colloidal $Fe_2O_3.H_2O$ which will serve as crystal nuclei. In a separate vessel mix 175 grams $Fe_2O_3.7H_2O$ in 3.5 liters water and add 1000 grams scrap iron. Heat to 60° C., add the colloidal $Fe_2O_3.H_2O$, bubble air through the solution holding at 60° C. for about 4 hours. Filter off, wash and dry the resultant crystals of acicular $Fe_2O_3.H_2O$. The particle size is about 0.1 to 0.3 micron wide and .6 to 1.8 microns long with an average length-to-width ratio of about 6 to 1.

The length-to-width ratio of the iron oxide particles used in the raw batch in applicant's process is of considerable importance. This ratio must be at least as high as the ratio desired for the final product. Thus, for the magnetic recording media herein, the desired ratio is 2.0 to 1.0 and greater; and the ratio for the iron oxide particles used in the raw batch should be 2.0 to 1.0 and greater also. It has been found that products with a length-to-width ratio as low as 1.1 to 1.0 provide an improvement over the non-acicular product. However, the preferred products have a length-to-width ratio of 2.0 to 1.0 and greater. The elongated ferrite particles herein may be acicular; i.e., needle-shaped. However, they are generally flat-sided and blunt-ended particles. The term "elongated" is intended to include "acicular."

The diffusion and recrystallization steps of applicant's processes are carried out at elevated temperatures by solid state reaction. The acicular iron oxide particles are intimately mixed with zinc oxide particles. The zinc oxide may be in the form of heat decomposable compounds such as carbonates, acetates, oxalates, hydroxides, etc.

The mixture is heated at a temperature high enough to cause diffusion of the zinc oxide, and reaction and recrystallization of the constituents; but not so high as to destroy the elongation of the particles. Temperatures between 500 and 1000° C. have been found to be suitable. The atmosphere during firing is adjusted to provide the required oxidation state for the iron cations.

In synthesizing the elongated ferrite particles herein by diffusion, the constituents are usually not completely reacted. As a consequence, following synthesis, the reaction product is treated to remove the unreacted part. This may be accomplished by washing with a dilute acid such as hydrochloric acid. Further, the composition of the product is not calculated from the raw batch, but is obtained by chemical and crystallographic analysis of the product. Such analysis consistently shows the formation of ferrites containing the diffused cations and having an elongated particle shape with a length-to-width ratio of 2.0 to 1.0 and greater.

*Example 1.*—To prepare typical elongated particles of zinc ferrous ferrite, proceed as follows: Mix the following materials for 2½ hours in a steel ball mill (1 litre), half full of ⅜" steel balls:

80.9 g.—Acicular hydrated alpha iron oxide having an average length-to-width ratio of about 6 to 1
18.5 g.—$ZnCo_3$
200 cc.—Methanol Dry in oven at 100° C. Screen through a 20 mesh screen. Place the powder in a stainless steel boat and put it into an atmosphere furnace. Heat the furnace to 275° C. for 3 hours in a hydrogen atmosphere. Change the atmosphere to $N_2$ and heat to 500° C. for 10 hours and then cool. Fill the furnace with water before removing the material to prevent oxidation. Remove the material from the furnace and rinse 2 times in dilute hydrochloric acid to dissolve any unreacted zinc oxide. Analysis of the product reveals the composition to be $$Zn^{+2}_{.157}Fe^{+2}_{.744}Fe^{3+}_{2.066}O_4$$

and to have a spinel-type structure. The particles have an average length-to-width ratio of about 6.0 to 1.0, and a moment of 4.63 $\mu_B$.

To make a magnetic tape according to the invention, weigh the following composition into a ⅓ liter ball mill half full of ⅜" steel balls:

25 grams elongated ferrite particles
0.4 gram lithium stearate
0.5 gram lead carbonate
50 grams of a polyvinyl acetate-chloride copolymer binder solution. Any of the commercially available solutions is satisfactory. The concentration of the binder is not critical and is adjusted to suit particular conditions.

The mixture is milled for about an hour, vented, and then milled for an additional 34 hours. If the mixture is too viscous for milling, a portion of the binder may be withheld and added after milling is completed. The mixture is now ready for coating.

A flexible, non-magnetic tape support about 0.0015 inch thick and about 0.250 inch wide, as of cellulose acetate, is provided. The milled composition is coated on one of the tape surfaces and dried to provide a finished coating about 0.0005 inch thick. One preferred method for coating is to place the milled composition in a reservoir above a knife edge wiper. The tape is pulled under the wiper at a rate of speed and under sufficient pressure to provide the desired coating thickness.

While the coating is wet, it is preferably run through a D.C. solenoid which provides an orienting magnetic field of about 1000 oersteds parallel to the plane of the tape and the direction of travel of the tape. Such magnetic fields orient the ferrite particles to provide higher effective remanence (Br) and a higher effective ratio of remanence to saturation magnetization (Br/Bs) in the finished tape.

The coated tape with or without orientation is allowed to dry in air, or may be force dried with the aid of heat and air circulated about the tape.

A typical magnetic recording tape is illustrated in FIGURE 1 comprising a cellulose acetate support 21*a*, 0.250 inch wide and 0.0015 inch thick. The support 21*a* is coated on one surface thereof with a mixture comprising particles of ferrite in a polyvinyl chloride-acetate binder.

Figure 2:
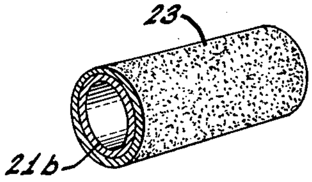
FIGURE 2 is a magnetic recording drum according to the invention.
Figure 3:
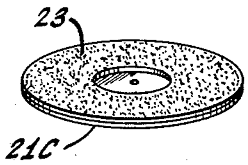
FIGURE 3 is a magnetic recording disc according to the invention.

The characteristics of a recording tape according to the foregoing example wherein the ferrite particles are oriented is as follows:

Remanent magnetization (Br)=1060 gauss
Coercive force (Hc)=268 oersteds
Magnetization at 1000 oersteds ($B_{1000}$)=1750 gauss The foregoing specific example may be varied to modify the characteristics thereof. The support may be a flexible tape as shown in FIGURE 1, or a drum coated on the outer surface thereof as shown in FIGURE 2, or a disc coated on one surface thereof as shown in FIGURE 3. The preferred support is the flexible tape shown in FIGURE 1. The support may be any magnetic or non-magnetic material such as iron, alloys, cellulose acetate, Mylar, nylon, paper, glass, ceramic, or cloth. Where the support is a tape it is preferably flexible. Where the support is a drum or disc as shown in FIGURES 2 or 3, it is preferably rigid. The binder for the ferrite particles may be magnetic or non-magnetic and may be selected from a very large group of binders. Examples of suitable binders are cellulose acetate, polyvinyl acetate, copolymers of polyvinyl chloride and polyvinyl acetate, sodium silicate, gum arabic, casein, glass, or low-melting metals. Where the support is flexible, the binder should also be flexible.

In Example 1, the acicular hydrated iron oxide in the raw batch may be replaced with any acicular iron oxide, hydrous or anhydrous, magnetic or non-magnetic, completely oxidized or partially reduced. Further, the zinc oxide may be released in part or in full by an oxide-forming compound of any cation or combination of cations which diffuse more rapidly than iron cations in said particles. Lithium may replace zinc in part or in full. Manganese, cobalt, copper, nickel, germanium, silver, aluminum, gallium, indium, thallium and tin may replace zinc or lithium in part. These are examples of cations which diffuse rapidly.

During diffusion, not only are cations diffused into the particles; charge compensating anions are also diffused in. Such anions are diffused in to maintain the electrical neutrality of the particles. Oxygen ions are the preferred anions. Examples of other anions are ions of chlorine, bromine, sulfur, selenium, nitrogen, phosphorus and arsenic as anions thereof. Combinations of anions may also be used.

*Example 2.*—Elongated magnetic particles of lithium ferrite may be prepared as follows. Mix 20 grams lithium hydroxide with 60 grams acicular anhydrous ferric oxide, such as Mapico 62E marketed by the Columbian Carbon Co., Trenton, New Jersey. The mixture is placed in an iron crucible and heated for 11 hours in air at about 600° C. The mixture was cooled, rinsed with dilute hydrochloric acid to remove unreacted constituents and then dried. The particles had the composition $Li_{.5}^{+1}Fe_{2.5}^{+3}O_4$ and had an average particle size of about 0.6 micron long and 0.1 micron wide. This is the approximate size and shape of the iron oxide used as the starting material.

Further, it has been found that the presence of small amounts of rapidly diffusible cations whose valence is different from that of the host cation (in this case $Fe^{+3}$) can promote the entry of less rapidly diffusible cations, permitting shorter firing times and/or reduced firing temperatures. The means by which this process is effected is believed to be by the introduction of cationic vacancies into the host lattice. By this theory, the fast diffusing cation should have a valence greater than that of the host cation, which in Example 3 below is +3. Alternatively, a fast diffusing anion produces the same effect if the valence thereof is less than that of the host anion.

*Example 3.*—Mill 17.5 grams of acicular hydrated iron oxide and 0.18 gram germanium dioxide, $GeO_2$, with absolute methanol for 16 hours. Dry the mixture and slurry with a solution of 18.9 grams of $MnCl_2 \cdot 4H_2O$ in 35 ml. $H_2O$. To the slurry thus formed add a solution of 8.0 grams of NaOH in 50 ml. $H_2O$. Filter the resulting mixture, wash and precipitate with water, dry, and fire in an atmosphere of nitrogen for 1 hour at 800° C. The product is comprised of elongated particles of manganese germanium ferrite and has a moment of 0.7 $\mu_B$. A material prepared identically except that germanium dioxide is omitted had a moment of about 0.1 $\mu_B$.

*Example 4.*—Mix 80.9 grams of acicular hydrated iron oxide into a solution of 36.6 grams of $Ga(NO_3)_3$ in 150 ml. $H_2O$. To this suspension, add 240 ml. 1:3$NH_4OH$. The precipitate is filtered, washed with water, and dried. The mixture is fired as in Example 1. The product is comprised of elongated particles of magnetic material having a moment of 3.55 $\mu_B$.

What is claimed is:

1. A magnetic recording medium comprising a support and a magnetic layer thereon comprising a particulate magnetic material in a solid, film-forming binder, said magnetic material consisting essentially of acicular magnetic ferrite particles having a length-to-width ratio of at least 2 to 1 and the molar composition:

$$A_a^{+\alpha}B_b^{+\beta} \ldots N_n^{+\nu}O_4$$

where A, B, . . . N represent cations, which are at least two in number, *a*, *b*, . . . *n* represent respectively the number of atoms of cations A, B, . . . N per formula unit, and $\alpha$, $\beta$, . . . $\nu$ represent respectively the valences of cations A, B, . . . N, where one of the cations present in appreciable amounts is trivalent iron, where $$a+b+ \ldots n$$

has a value that is essentially between 2⅔ and 3, where $a\alpha+b\beta+ \ldots n\nu$ is about eight, and where the cations A, B, . . . N include at least one of the class of rapidly diffusible cations selected from the group consisting of lithium, zinc, manganese, cobalt, copper, nickel, germanium, silver, aluminum, gallium, indium, thallium, and tin.

2. The magnetic record medium of claim 1 wherein the cations present are Mn, Ge, and $Fe^{3+}$.

3. The magnetic record medium of claim 1 wherein the cations present are $Li^{1+}$ and $Fe^{3+}$ cations.

4. The method for preparing acicular magnetic ferrite particles comprising heating a physical mixture of acicular iron oxide particles having a length-to-width ratio of at least 2 to 1 and other particles containing cations and anions which are rapidly-diffusible in said iron oxide, said cations being selected from the group consisting of lithium, zinc, manganese, cobalt, copper, nickel, germanium, silver, aluminum, gallium, indium, thallium, and tin, and said anions being selected from the group consisting of oxygen, chlorine, bromine, sulfur, selenium, nitrogen, phosphorus, and arsenic, until a portion of said cations and anions have diffused into said iron oxide and a spinel-type crystal structure is formed, the heating step being carried out at temperatures between about 500 and 1000° C. and for time intervals insufficient to destroy the acicular shape of said iron oxide particles.

5. The method of claim 4 wherein said other particles are manganese chloride and germanium.

6. The method of claim 4 wherein said other particles are lithium hydroxide.

7. A magnetic material adapted for use in a magnetic recording medium consisting essentially of acicular magnetic ferrite particles and characterized by having a length-to-width ratio of at least 2 to 1, a spinel-type crystal structure, and the molar composition:

$$A_a^{+\alpha}B_b^{+\beta} \ldots N_n^{+\nu}O_4$$

where A, B, . . . N represent cations, which are at least two in number, *a*, *b*, . . . *n* represent respectively the number of atoms of cations A, B, . . . N per formula unit, and $\alpha$, $\beta$, . . . $\nu$ represent respectively the valences of cations A, B, . . . N, where one of the cations present in appreciable amounts is trivalent iron, where $$a+b+ \ldots n$$

has a value that is essentially between 2⅔ and 3, where $a\alpha+b\beta+ \ldots n\nu$ is equal to about eight, and where the cations A, B, . . . N include at least one of the class of rapidly diffusible cations selected from the group consisting of lithium, zinc, manganese, cobalt, copper, nickel, germanium, silver, aluminum, gallium, indium, thallium, and tin.

8. The magnetic material of claim 7 including cations having a valence greater than trivalent.

9. The magnetic material of claim 7 wherein the cations present are Mn, Ge and $Fe^{3+}$ cations.

10. The magnetic material of claim 7 wherein the cations present are $Li^{1+}$ and $Fe^{3+}$ cations.

11. The magnetic material of claim 9 including germanium cations having a valence of +4.

12. The method for preparing acicular magnetic ferrite particles comprising heating a physical mixture of acicular iron oxide particles having a length-to-width ratio of at least 2 to 1, and other particles containing cations and anions which are rapidly-diffusible in said iron oxide, said cations being selected from the group consisting of lithium, zinc, manganese, cobalt, copper, nickel, germanium, silver, aluminum, gallium, indium, thallium and tin, and said anions being selected from the group consisting of oxygen, chlorine, bromine, sulfur, selenium, nitrogen, phosphorus, and arsenic, until a portion of said cations and anions have diffused into said iron oxide and a spinel-type crystal structure is formed, the heating step being carried out at temperatures substantially below the sintering temperature of said mixture and for time intervals insufficient to destroy the acicular shape of said iron oxide particles.

References Cited in the file of this patent

UNITED STATES PATENTS

| | | |
|---|---|---|
| 2,239,144 | Dean et al. | Apr. 22, 1941 |
| 2,576,456 | Harvey et al. | Nov. 27, 1951 |
| 2,646,608 | Beeke | July 28, 1953 |
| 2,699,408 | Camras | Jan. 11, 1955 |
| 2,714,580 | Dean et al. | Aug. 2, 1955 |
| 2,751,353 | Gorter | June 19, 1956 |
| 2,770,523 | Toole | Nov. 13, 1956 |
| 2,799,609 | Dalton | July 16, 1957 |
| 2,819,186 | Franck | Jan. 7, 1958 |
| 2,862,845 | Szegvari | Dec. 2, 1958 |
| 2,941,901 | Prill | June 21, 1960 |

FOREIGN PATENTS

| | | |
|---|---|---|
| 696,216 | Great Britain | Aug. 26, 1953 |
| 765,464 | Great Britain | Jan. 9, 1957 |
| S. 29,347 | Germany | Nov. 22, 1956 |

OTHER REFERENCES

Elements of Magnetic Tape Recording by Haynes, p. 72, Prentice-Hall, Inc., Englewood Cliffs, N.J. (1957).

Kordes et al.: Chemical Abstracts, May 25, 1952, col. 4411.

Gorter: Phillips Research Reports, December 1954, pages 406, 411, 416, 422, 428–430 ,441.

UNITED STATES PATENT OFFICE

CERTIFICATE OF CORRECTION

Patent No. 3,047,505 July 31, 1962

Arthur Miller

It is hereby certified that error appears in the above numbered patent requiring correction and that the said Letters Patent should read as corrected below.

Column 1, line 21, for "a+b . . . n" read -- a+b+ . . . n --; line 22, for "$a\alpha+b\beta$ . . . $n\nu$" read -- $a\alpha+b\beta+$ . . . $n\nu$ --; column 5, line 2, for "released" read -- replaced --; line 49, for "and", first occurrence, read -- the --; column 6, line 33, after "germanium" insert -- oxide --.

Signed and sealed this 21st day of May 1963.

(SEAL)
Attest:

ERNEST W. SWIDER
Attesting Officer

DAVID L. LADD
Commissioner of Patents